Patented July 12, 1938

2,123,214

UNITED STATES PATENT OFFICE 2,123,214

STABILIZED SOLUBLE STANNITE DEPILATORY

William B. Stoddard and Julius Berlin, New York, N. Y.

No Drawing. Application November 2, 1935, Serial No. 47,973

4 Claims. (Cl. 167—89)

Our invention relates to a depilatory composition having a soluble stannite as the active ingredient.

It was known heretofore that stannites have the property of destroying hair substance. Inasmuch as stannites have no appreciable odor, they would form highly desirable depilatory materials as compared with the sulphides which have been used substantially exclusively heretofore and which have very offensive odors. The alkali stannites are, however, very active substances tending to decompose in two ways, 1st by the formation of stannates with the simultaneous production of metallic tin, and 2nd, by interaction with water forming stannous oxide and the hydroxide of the alkali metal. These decompositions have heretofore been an obstacle to the use of stannites as depilatory agents because, for this purpose it is necessary that the stannites remain undecomposed for long periods of time as, for example, for several months or a year in order to enable them to be distributed, transported and sold in the retail trade.

Attempts have been made heretofore to stabilize the soluble stannites in the presence of a strongly alkaline solution. Not only, however, has the stability of such solutions as heretofore made been uncertain, but the presence of the alkali or alkaline reacting substances in the solution is irritating to the skin, particularly as several minutes time is required for the action of the stannite on the hair, and contact of a strongly alkaline solution with the skin for such a period of time is highly irritating.

These various disadvantages are obviated by our present invention which provides a stable stannite depilatory capable of being stored for long periods of time and having only a limited or very slight alkalinity insufficient to irritate the skin under normal conditions of use.

In our present invention we form a soluble stannite such as sodium stannite, potassium stannite, or other alkali stannite in an aqueous solution that is not strongly alkaline as, for example, one that has a pH value less than 12.6, and which also contains a stabilizer active in a solution of this low alkalinity. The stabilizers suitable for this purpose are of a class consisting of water soluble organic compounds having three or more carbinol hydroxy groups, or three hydroxy groups other than those in a carboxyl group, and also of the soluble silicates. Examples of the organic compounds having three or more hydroxy groups are triethanolamine, glycerine, dextrine, gum tragacanth, and the sugars such as cane sugar, glucose, or other hexoses or pentoses. Examples of the soluble silicates are sodium or potassium metasilicate.

After the stabilized solution of the stannite has been formed, it may be diluted somewhat if its concentration is too great and then mixed with other compounding ingredients such as finely ground kaolin or clay, or other earthy materials inert to the substances contained in the solution, to form a paste. The material thus formed may be packed in tubes or jars and will remain stable over long periods of time sufficient to enable it to be transported and stored until sold.

It will be understood that the sodium or other soluble stannites may be formed in any suitable manner by chemical or electro-chemical reactions.

The following is an example of the method of formation of a stannite suitable for the purposes of our invention.

The stannite may be economically produced by adding to an appropriate amount of caustic alkali solution, in which the proper quantity of stabilizer has been dissolved the equivalent amount of stannous salt solution. The concentration of both the alkali and stannous salt solution should be such as to yield a stannite solution of requisite strength. The normality of the stannous solution should, therefore, be determined in advance so that the required amount of sodium hydroxide may be used to form the stannite without having an excess. For example, 454 grams of chemically pure stannous chloride ($SnCl_2.2H_2O$) were added to 450 c. c. of water. Analysis of the resulting solution showed that it was 6.225 normal in tin, and 6.65 normal with respect to the free and combined hydrochloric acid, or a total of 12.875 normal for the combined reaction. Therefore, 1 c. c. of the stannous solution will require 12.875 c. c. of normal sodium hydroxide or alkali hydroxide to combine with the chloride radicle and with the resulting stannous hydroxide.

For this purpose a 10% solution of sodium hydroxide was carefully standardized and found to be exactly 2.5 normal. It is, therefore, evident that 25 c. c. of the tin solution requires 128.8 c. c. of the 10% sodium hydroxide solution. These solutions were used in each of the following examples.

*Example I*

10 c. c. of triethanolamine were added to 128.8 c. c. of the 10% sodium hydroxide solution and the solution was then heated to 65° C. 25 c. c. of the tin solution were then added and the solution heated to 80° C. with constant stirring. A clear solution of sodium stannite resulted and all of the reagents remained in solution except for a trace or small amount of impurities which were present in the reagents. The solution was made up to a volume of 175 c. c. and filtered to remove the traces of impurities and to leave a colorless sparkling filtrate. The pH value of this solution was 12.22. It was capable of removing very coarse hair in five minutes without irritating the skin, its alkalinity being relatively much less than that of solutions in which stability is sought by excess alkali such solutions generally having a pH value of 12.6 or twice the alkalinity of the above solution. The resulting stannite solution was then mixed with a suitable filler, such as kaolin and, upon filling into tubes or jars, remained stable and unaffected for long periods of time such, for example, as ten months or longer, without decomposition or deterioration. Other fillers, such as precipitated chalk or earthy materials, may be employed, but those are preferred which are inert as, for example, kaolin.

*Example II*

In this example the same procedure was followed as in Example I except that 10 grams of cane sugar were substituted for the triethanolamine. In this case a quantity of white insoluble matter remained at 80° C. but substantially all of it dissolved when boiled over a free flame. The resulting stannite solution is non-irritating and stable.

*Example III*

The procedure of Example I was followed except that 10 c. c. of glycerine were substituted for the triethanolamine. The same result was obtained, the reagents dissolving to a clear solution at 80° C., except for traces of impurities present in the original solution.

*Example IV*

5 grams of sodium metasilicate were dissolved in 125 c. c. of sodium hydroxide solution. The resulting solution was heated to 65° C., and 25 c. c. of the stannous chloride solution were added. The resulting solution was heated to 88° C., in hot water. The tin went into solution completely. The resulting solution was then made up to 175 c. c. and filtered to remove traces of impurities. The filtrate was clear, colorless and sparkling. It had a pH value of 12.3. It removed hair satisfactorily and caused no irritation of the skin. In comparison with a 3% solution of metasilicate, the pH value of which is 12.6 its pH value or alkalinity is relatively low.

All of the above pH values were determined electrometrically by direct uncorrected reading using a glass electrode inasmuch as a hydrogen electrode cannot be used accurately because of the reducing action of the material. For the same reason colorimetric measurements using indicators are not satisfactory.

This solution may be made up into a paste with the inert fillers, such as finely powdered kaolin, and forms a very stable and satisfactory depilatory. It has the advantage that somewhat less than the required amount of sodium hydroxide to form the soluble stannite may be employed, and the metasilicate will itself supply the deficiency of the alkali, and also provide an excess to stabilize the solution.

It will be understood that the above are merely given by way of examples of materials from the class of stabilizers which consists of organic compounds having at least three hydroxyl groups and of the soluble silicates. It will be understood, for example, that other silicates than sodium metasilicate may be employed such, for example, as potassium silicate or water glass. Also that others of the wide group of tri-hydroxy or poly-hydroxy organic compounds may be used, those being selected, however, which are themselves stable under the conditions of reaction and of storage for a period of time.

The stabilizers as used in the examples accomplish three things—

1st—They prevent the decomposition of the stannous hydroxide which is first formed on adding the stannous salt to the alkali solution containing them.

2nd—They permit the solution of the stannous hydroxide in the theoretical amount of alkali hydroxide.

3rd—They stabilize the alkali stannite solution after it is formed.

In our invention it is also possible to obtain sodium stannite solutions of a concentration much greater than that required for depilatory preparations. By a suitable selection of the concentration of the reagents as, for example, using a 40% solution of sodium hydroxide, a correspondingly stronger solution of the tin and with metasilicate as a stabilizer, a proportionately more concentrated stannite solution is obtained.

What we claim is—

1. A soluble stannite depilatory solution having a pH value of less than 12.6 and containing alkali silicates as stabilizers.

2. A soluble stannite depilatory solution containing sodium stannite and sodium metasilicate and having a pH value less than 12.6.

3. A depilatory composition comprising a base of substantially inert finely ground solid material, and a soluble stannite solution containing a soluble alkali silicate as stabilizer.

4. A depilatory composition comprising a base of substantially inert finely ground solid material and a soluble stannite solution containing an alkali meta-silicate as stabilizer, and having a pH value of less than 12.6.

WILLIAM B. STODDARD.
JULIUS BERLIN.